Patented Dec. 20, 1938

2,140,509

UNITED STATES PATENT OFFICE 2,140,509

MERCURATED 3-NITRO 4-ALKYL PHENOLS

Walter G. Christiansen, Glen Ridge, N. J., and Eugene Moness, New York, N. Y., assignors to E. R. Squibb & Sons, New York, N. Y., a corporation of New York No Drawing. Application December 6, 1934, Serial No. 756,276

6 Claims. (Cl. 260—433)

This invention relates to, and has for its object the provision of, certain mercurated 3-nitro 4-alkyl phenols, and an advantageous method of preparing them.

The mercurated 3-nitro 4-alkyl phenols of this invention are comprised by the general formula

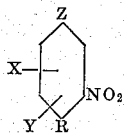

wherein X represents mercury linked to an anion; Y represents hydrogen, or mercury linked to an anion; Z represents hydroxy; or X and Z together represent anhydro-mercuri, that is

and R represents an alkyl.

They may be prepared by interacting the corresponding unmercurated 3 - nitro 4 - alkyl phenols with mercuric acetate, and replacing the acetoxy with the desired anion by means of the compound of that anion with an alkali metal (cf. Whitmore's Organic Compounds of Mercury, 1921, pp. 257, 258). Formation of the monomercurated compound is favored by using less of the mercuric acetate in proportion to the unmercurated 3-nitro 4-alkyl phenol, adding it more slowly, and maintaining a lower reaction temperature. These mercurated 3-nitro 4-alkyl phenols have been found to be active germicides.

EXAMPLES

2,4-dinitro isopropyl benzene 48 g. isopropyl benzene is added dropwise to a stirred solution of 112 cc. concentrated nitric acid in 240 cc. concentrated sulfuric acid, the mixture being continuously cooled externally by means of running cold water, and the addition being at such a rate as to maintain the temperature at 30–35°. On completion of the addition, in about an hour, the mixture is heated on the steam-bath for forty-five minutes and cooled, the acid is drawn off, and the separated oil is washed twice with water and dissolved in ether, and the ether solution is washed successively with water, a ten percent solution of sodium carbonate, and water, dried over anhydrous sodium sulfate, and filtered. After distilling off the ether, the crude 2,4-dinitro isopropyl benzene is distilled in vacuo, coming over as a pale yellow oil at 130–135°/2–3 mm.

2-nitro 4-amino isopropyl benzene 42 g. 2,4-dinitro isopropyl benzene is dissolved in 120 cc. absolute alcohol and a solution of ammonium sulfide (made by mixing 144 cc. 28% ammonium hydroxide with 144 cc. absolute alcohol, saturating half the solution with hydrogen sulfide, and mixing with the other half) is added, and the mixture is boiled gently on a hot plate for forty-five minutes. The clear dark-red liquid is filtered hot from separated sulfur, and diluted with water. On cooling, orange crystals form. These are filtered off, washed, and dissolved in 150 cc. boiling concentrated hydrochloric acid. The solution is diluted with a liter of water and filtered while hot to remove a slight insoluble residue. On cooling, the crystals of 2-nitro 4-amino isopropyl benzene hydrochloride separate out as a light-yellow feathery mass, which on being filtered off, dissolved in water, and made slightly alkaline with dilute sodium hydroxide solution, yields the bright orange 2-nitro 4-amino isopropyl benzene.

3-nitro 4-isopropyl phenol 21 g. 2-nitro 4-amino isopropyl benzene is dissolved in a solution of 27 cc. concentrated hydrochloric acid in 150 cc. water. The solution being cooled to and maintained at 0°, a solution of 10 g. sodium nitrite in 30 cc. water is added dropwise with stirring, and the clear yellow solution of the diazonium salt is added dropwise to a boiling solution of 30 cc. concentrated sulfuric acid in 250 cc. water. Nitrogen is evolved, and the tarry oil that separates out is extracted with ether. The extract is washed with water and dried over anhydrous sodium sulfate. The ether being distilled off and the crude tarry oil being distilled in vacuo, there is obtained a dark-red viscous oil coming over at 124–140°/3–4 mm. This is dissolved in dilute alkali, the solution is shaken with ether to remove any alkali-insoluble material, and the alkaline solution is separated and acidified with dilute hydrochloric acid. The separated oil is extracted with ether, and the extract is washed free of acid and dried over anhydrous sodium sulfate. Distillation of the ether leaves 3-nitro 4-isopropyl phenol.

Di-hydroxymercuri 3-nitro 4-isopropyl phenol and mono-anhydro-mercuri 3-nitro 4-isopropyl phenol 2.17 g. 3-nitro 4-isopropyl phenol is dissolved in 22 cc. methyl alcohol, and while refluxing on the steam-bath, a solution of 7.6 g. mercuric acetate in 22 cc. water is added in a rapid stream.

After refluxing for nine hours, the test for divalent mercury being negative, the reaction mixture is cooled, the supernatant liquid is decanted off, and the brown crust formed is washed by decantation with a little methyl alcohol and then with water, and is dissolved in dilute alkali. Saturation with carbon dioxide precipitates di-hydroxymercuri 3-nitro 4-isopropyl phenol as a yellowish-brown solid. Filtration and acidification of the filtrate with dilute acetic acid solution yields a mixture that is about twenty-six percent di-hydroxymercuri 3-nitro 4-isopropyl phenol and seventy-four percent mono-anhydro-mercuri 3-nitro 4-isopropyl phenol.

*Di-hydroxymercuri 3-nitro 4-methyl phenol and mono-hydroxymercuri 3-nitro 4-methyl phenol*

3.7 g. 3-nitro 4-methyl phenol is dissolved in 37 cc. methyl alcohol, and there is added 15.3 g. (2 moles) mercuric acetate dissolved in 37 cc. water slightly acidulated with dilute acetic acid, and the mixture is refluxed for five hours. A crystalline substance that has separated out is filtered off, washed thoroughly with methyl alcohol, and with water acidulated with acetic acid, and with water, and dissolved in 200 cc. 2.5% sodium hydroxide solution. The clear dark-red solution obtained is filtered off from a slight undissolved residue. Addition of carbon dioxide precipitates a yellowish-brown powder that is about 66% di-hydroxymercuri 3-nitro 4-methyl phenol and 34% mono-hydroxymercuri 3-nitro 4-methyl phenol, dissolving in dilute alkali to give a clear orange-red solution.

Manifestly, by substituting some other alkyl for the isopropyl of the isopropyl benzene in the first example—as ethyl, normalpropyl, butyl, or amyl—and employing the same series of reactions, the corresponding alkyl phenol—as 4-ethyl, 4-normalpropyl, 4-butyl, or 4-amyl, respectively—may be obtained.

It is to be understood that the foregoing examples are merely illustrative and by no means limitative of the invention, which may be variously otherwise embodied within the scope of the appended claims.

We claim:
1. Di-hydroxymercuri 3-nitro 4-isopropyl phenol.
2. Mono-anhydro-mercuri 3-nitro 4-isopropyl phenol.
3. Mercurated 3-nitro 4-isopropyl phenol.
4. Mercurated 3-nitro 4-R phenols, wherein R represents a lower alkyl having at least three carbon atoms.
5. The method of preparing mercurated 3-nitro-4-R phenols, wherein R represents a lower alkyl having at least three carbon atoms, which comprises converting the corresponding alkyl benzene into a 2,4-dinitro alkyl benzene, converting the dinitro compound into a 2-nitro-4-amino alkyl benzene, replacing the amino group with a hydroxy group, and mercurating the resulting 3-nitro 4-alkyl phenol.
6. The method of preparing mercurated 3-nitro-4-isopropyl phenol, which comprises converting isopropyl benzene into 2,4-dinitro isopropyl benzene, converting the dinitro compound into 2-nitro-4-amino isopropyl benzene, replacing the amino group with a hydroxy group, and mercurating the resulting 3-nitro 4-isopropyl phenol.

WALTER G. CHRISTIANSEN.
EUGENE MONESS.